(12) United States Patent
Couasnon

(10) Patent No.: US 9,566,878 B2
(45) Date of Patent: Feb. 14, 2017

(54) RAIL FOR A VEHICLE SEAT AND VEHICLE SEAT COMPRISING SUCH A RAIL

(71) Applicant: Faurecia Sièges d'Automobile, Nanterre (FR)

(72) Inventor: Christian Couasnon, Flers (FR)

(73) Assignee: Faurecia Sièges d'Automobile, Nanterre (FR)

( * ) Notice: Subject to any disclaimer, the term of this patent is extended or adjusted under 35 U.S.C. 154(b) by 0 days.

(21) Appl. No.: 14/651,131

(22) PCT Filed: Nov. 5, 2013

(86) PCT No.: PCT/FR2013/052629
§ 371 (c)(1),
(2) Date: Jun. 10, 2015

(87) PCT Pub. No.: WO2014/091099
PCT Pub. Date: Jun. 19, 2014

(65) Prior Publication Data
US 2015/0314707 A1    Nov. 5, 2015

(30) Foreign Application Priority Data

Dec. 10, 2012  (FR) ..................................... 12 61847

(51) Int. Cl.
*B60N 2/02* (2006.01)
*B60N 2/07* (2006.01)
(Continued)

(52) U.S. Cl.
CPC ............. *B60N 2/0705* (2013.01); *B60N 2/075* (2013.01); *B60N 2/0715* (2013.01);
(Continued)

(58) Field of Classification Search
CPC ... B60N 2/0715; B60N 2/0705; B60N 2/0818; B60N 2/0825; B60N 2/067; B60N 2/0232; B60N 2/0843; B60N 2/0875; B60N 2/085; B60N 2/123; B60N 2/06; B60N 2/0887; B60N 2/0732; B60N 2/072; B60N 2/071
(Continued)

(56) References Cited

U.S. PATENT DOCUMENTS 5,806,825 A * 9/1998 Couasnon ............ B60N 2/0705
248/429
6,086,154 A * 7/2000 Mathey ................ B60N 2/0705
248/429
(Continued)

FOREIGN PATENT DOCUMENTS

| EP | 0765777 A1 | 4/1997 |
|----|-----------|--------|
| FR | 2818206 A1 | 6/2002 |
| FR | 2969967 A1 | 7/2012 |

OTHER PUBLICATIONS

English translation of the International Search Report for PCT/FR2013/052629, dated Apr. 16, 2014, 2 pages.
(Continued)

*Primary Examiner* — Steven Marsh
(74) *Attorney, Agent, or Firm* — Reising Ethington P.C.

(57) ABSTRACT

A rail for a vehicle seat, comprising first and second profiles (8, 9) that slide relative to one another, a lock (19) movably mounted inside the first profile, a spring blade (29) fixed to the first profile and comprising a control portion (31) designed to act on the lock so as to unlock it.

6 Claims, 10 Drawing Sheets

(51) Int. Cl.
*B60N 2/075* (2006.01)
*B60N 2/08* (2006.01)

(52) U.S. Cl.
CPC ......... *B60N 2/0818* (2013.01); *B60N 2/0843* (2013.01); *B60N 2/0881* (2013.01)

(58) Field of Classification Search
USPC ................................................. 248/424, 429
See application file for complete search history.

(56) References Cited

U.S. PATENT DOCUMENTS

| | | | | |
|---|---|---|---|---|
| 6,869,057 | B2* | 3/2005 | Matsumoto .......... | B60N 2/0705 248/429 |
| 8,398,043 | B2* | 3/2013 | Kimura ................ | B60N 2/0705 248/424 |
| 2004/0232750 | A1* | 11/2004 | Rohee ...................... | B60N 2/08 297/334 |
| 2014/0138510 | A1* | 5/2014 | Yamada ............... | B60N 2/0705 248/429 |
| 2014/0145054 | A1* | 5/2014 | Yamada ............... | B60N 2/0705 248/429 |

OTHER PUBLICATIONS

English translation of the Written Opinion for PCT/FR2013/052629, dated Apr. 16, 2014, 7 pages.

* cited by examiner

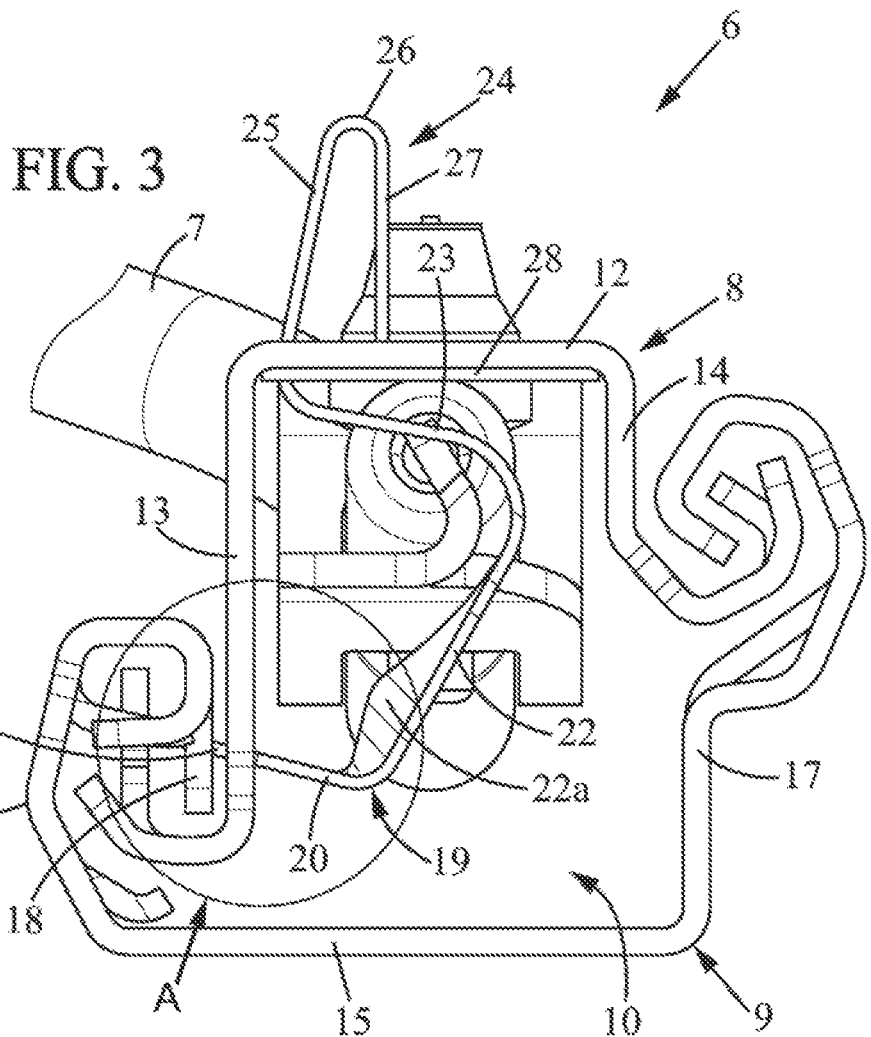
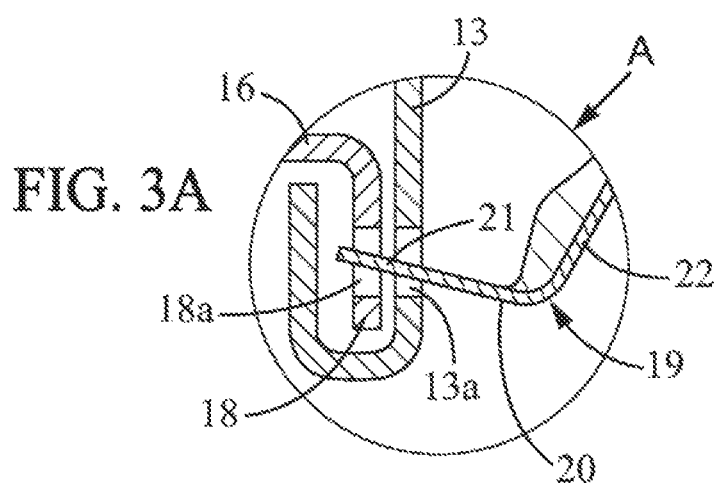

RAIL FOR A VEHICLE SEAT AND VEHICLE SEAT COMPRISING SUCH A RAIL

FIELD OF THE INVENTION

The present invention relates to rails for vehicle seats and to vehicle seats comprising such rails.

More particularly, the invention relates to a rail for a vehicle seat, comprising:
- first and second profile sections mounted so as to slide relative to one another in a longitudinal direction and defining a hollow inside space between them,
- a lock predominantly arranged within said inside space and movable between a locked position where said lock immobilizes the first and second profile sections relative to one another, and an unlocked position where said lock allows the first and second profile sections to slide relative to one another,
- a spring blade attached to the first profile section within said inside space and controlling the lock, this spring blade normally being in a rest position where said spring blade leaves the lock in the locked position, and
- a control member connected to the spring blade and actuated by a user to elastically deform the spring blade to an unlocking position where said spring blade places the lock in the unlocked position.

BACKGROUND OF THE INVENTION

Document FR2969967 discloses an example of such a rail, where the lock is integral to the free end of the spring blade and moves vertically with this free end upon actuation of the control member.

Rails of this type are of particularly simple and robust construction; they are also particularly compact, as the spring blade and lock are located within the inside space of the rail. However, they have the disadvantage of imposing a particular type of lock with specific unlocking kinematics.

OBJECTS AND SUMMARY OF THE INVENTION

The present invention is intended to further improve rails of this type, in particular to make them more readily adaptable to various types of locks which may have locking/unlocking kinematics other than a vertical movement identical to that of the spring blade.

To this end, according to the invention, a rail of the kind in question is characterized in that the lock is mounted on the first profile section independently of the spring blade and is resiliently biased toward the locked position, and said spring blade comprises a control portion adapted to act on the lock in order to move it toward the unlocked position when the control member is actuated.

These arrangements maintain the compactness and the simple and robust character of the rail that are provided by the control system with its elastic blade mounted within the inside space of the rail, while allowing considerable freedom in the choice of lock and locking/unlocking kinematics. In addition, it is possible to reuse a large number of standard components of the rails of the aforementioned type, which tends to further reduce the cost of the rail.

In various embodiments of the rail according to the invention, one or more of the following arrangements may possibly be used:
- the control portion of the spring blade is adapted to act by simply pressing a cam portion that is part of the lock, the lock being moved to the unlocked position by the effect of the cam;
- the control member comprises a lever connected to the spring blade and extending into the inside space of the rail;
- the second profile section comprises a web and two side flanges, at least one of the side flanges of the second profile section comprising indentations suitable for receiving the lock in the locking position, and the lock is mounted on the first profile section so as to move in a transverse direction to allow selectively engaging and disengaging said lock relative to said indentations;
- the first profile section comprises a web and two side flanges arranged between the side flanges of the second profile section, and the lock passes through at least one window formed in one of the side flanges of the first profile section;
- the lock is connected to the first profile section by at least one elastic portion resiliently biasing the lock toward the locked position;
- said elastic portion is part of the lock and is attached to the first profile section;
- each of the first and second profile sections comprises a web and two side flanges, at least one of the side flanges of the second profile section comprising indentations suitable for receiving the lock in the locking position, the lock being a metal part which comprises:
  - a locking portion substantially parallel to the web of the second profile section and adapted to selectively engage with and disengage from said indentations,
  - a cam portion with which the control portion of the spring blade is adapted to act by simply pressing to move the lock to the unlocked position by the effect of the cam, this cam portion extending the locking portion towards the web of the first profile section,
  - said elastic portion extending the cam portion toward the web of the first profile section;
- said elastic portion of the lock comprises first and second blades connected by a fold, the first blade extending the cam portion outwardly through a window arranged in the web of the first profile section and the second blade extending from the fold toward the inside space of the rail through said window, to an attachment portion fixed beneath the web of the first profile section;
- the lock is pivotally mounted on the first profile section;
- the first profile section comprises a web and two side flanges, and the lock pivots on a pivot pin carried by a support fixed beneath the web of the first profile section;
- the lock is integral to a spring blade which presses against the inside of one of the side flanges of the first profile section in order to resiliently bias the lock toward the locked position.

The invention also relates to a vehicle seat comprising at least one rail as defined above and a seating portion attached to the first profile section of said rail.

Other features and advantages of the invention will become apparent from the following description of two of its embodiments, given by way of non-limiting example and with reference to the accompanying drawings.

BRIEF DESCRIPTION OF THE DRAWINGS

In the drawings:

FIG. 3 is an end view of the rail of FIG. 2, in the locked position, FIG. 3A is a cross-sectional detail view of A of FIG. 3.

In the various figures, the same references designate identical or similar elements.

DETAILED DESCRIPTION

Figure 1:
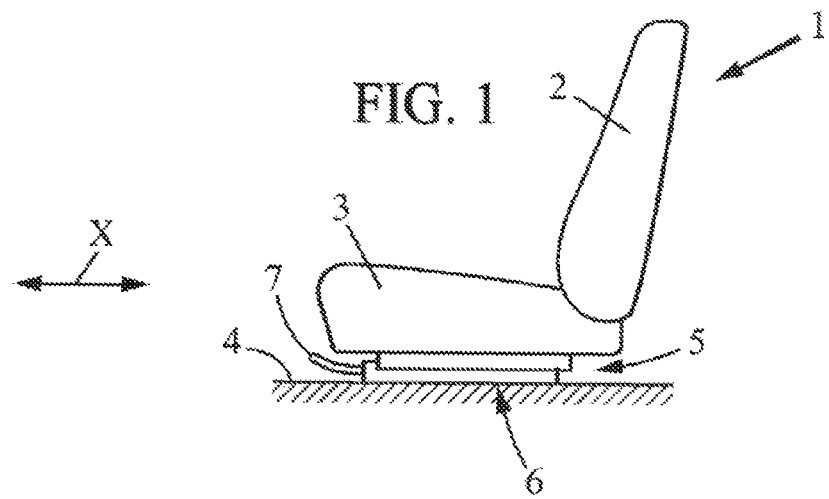
FIG. 1 is a schematic view of a seat which can be equipped with a set of rails according to the invention.

FIG. 1 represents a motor vehicle seat 1 which comprises a backrest 2 mounted on a seating portion 3. The seating portion 3 is attached to the floor 4 of the vehicle by means of a set of rails 5 which allows the seat 1 to slide over the floor 4 in a longitudinal direction X.

Figure 2:
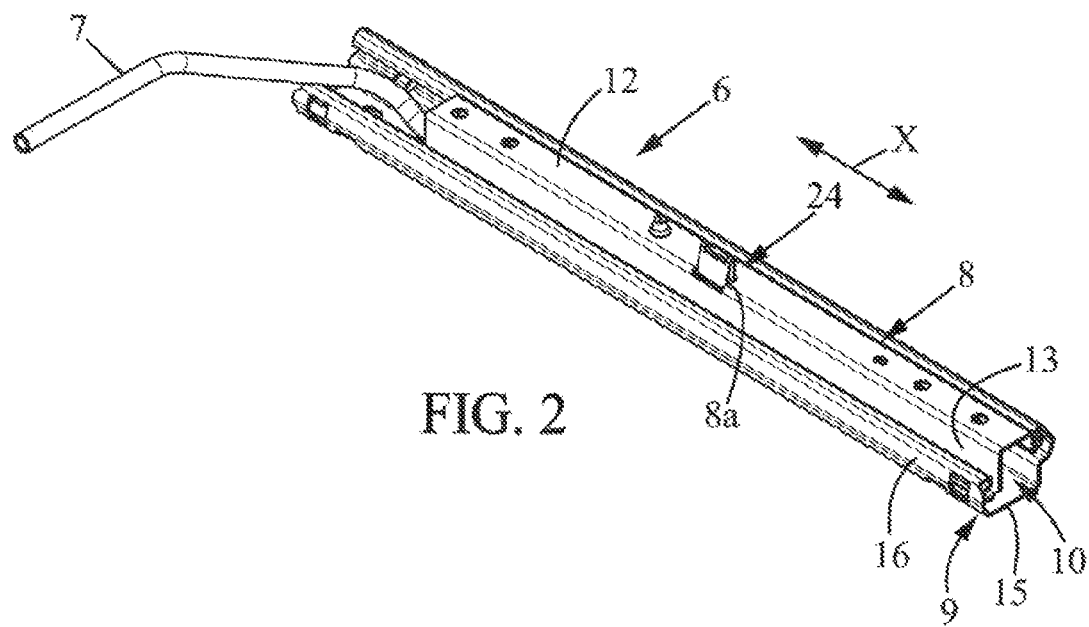
FIG. 2 is a perspective view of one of the rails supporting a seating portion of FIG. 1, in a first embodiment of the invention.

The set of rails 5 comprises two parallel rails 6 extending in the longitudinal direction X, one of which is visible in FIG. 2, and an actuating member 7 common to both rails 6, for example in the form of a generally U-shaped crossbar.

Each rail 6 comprises a first metal profile section 8 which supports the seating portion 3 and is mounted to slide in the longitudinal direction X on a second metal profile section 9 attached to the floor 4. The first and second profile sections 8, 9 are, for example, nested one within the other to define a hollow inside space 10, the first profile section 8 being for example a male profile section and the second profile section 9 being for example a female profile section.

As represented in FIGS. 3, 3A, 4, and 5, and as an example, the first profile section 8 can have a substantially U-shaped cross-section comprising an upper horizontal web 12 attached to the seating portion 3 of the seat 1, and two side flanges 13, 14 which each extend substantially vertically downward from the seating portion 4. The second profile section 9 can also have a U-shaped cross-section, with a lower horizontal web 15 attached to the floor 4 of the vehicle and extending parallel to the upper web 12 of the first profile section 8, and two side flanges 16, 17 which each extend substantially vertically upward from the lower web 15.

In the example shown, the side flange 16 of the second profile section 9 forms a concave trough having a substantially vertical hanging terminal wall 18, provided with indentations 18a regularly arranged along the longitudinal direction X with a constant spacing between them. These indentations 18a are suitable for receiving teeth 21 of a lock 19 when the latter is in the locked position and immobilizes the first profile section 8. The lock 19 is carried by the first profile section 8 and is arranged substantially within said inside space 10 of the rail 6. The teeth 21 of the lock 19 advantageously pass through windows 13a formed in the side flange 13 of the first profile section 8 (FIG. 3A).

The lock 19 is movably mounted relative to the first profile section 8, so that a locking portion 20 (comprising the teeth 21) moves in a transverse direction, perpendicular to the longitudinal direction X, between said locked position and an unlocked position where said lock 19 allows the first profile section 8 of the rail 6 to slide in the longitudinal direction X.

The lock 19 is connected to the first profile section 8 by at least one elastic portion 24, which in this case is part of the lock 19 itself, this elastic portion 24 resiliently biasing the lock 19 toward the locked position.

Figure 4:
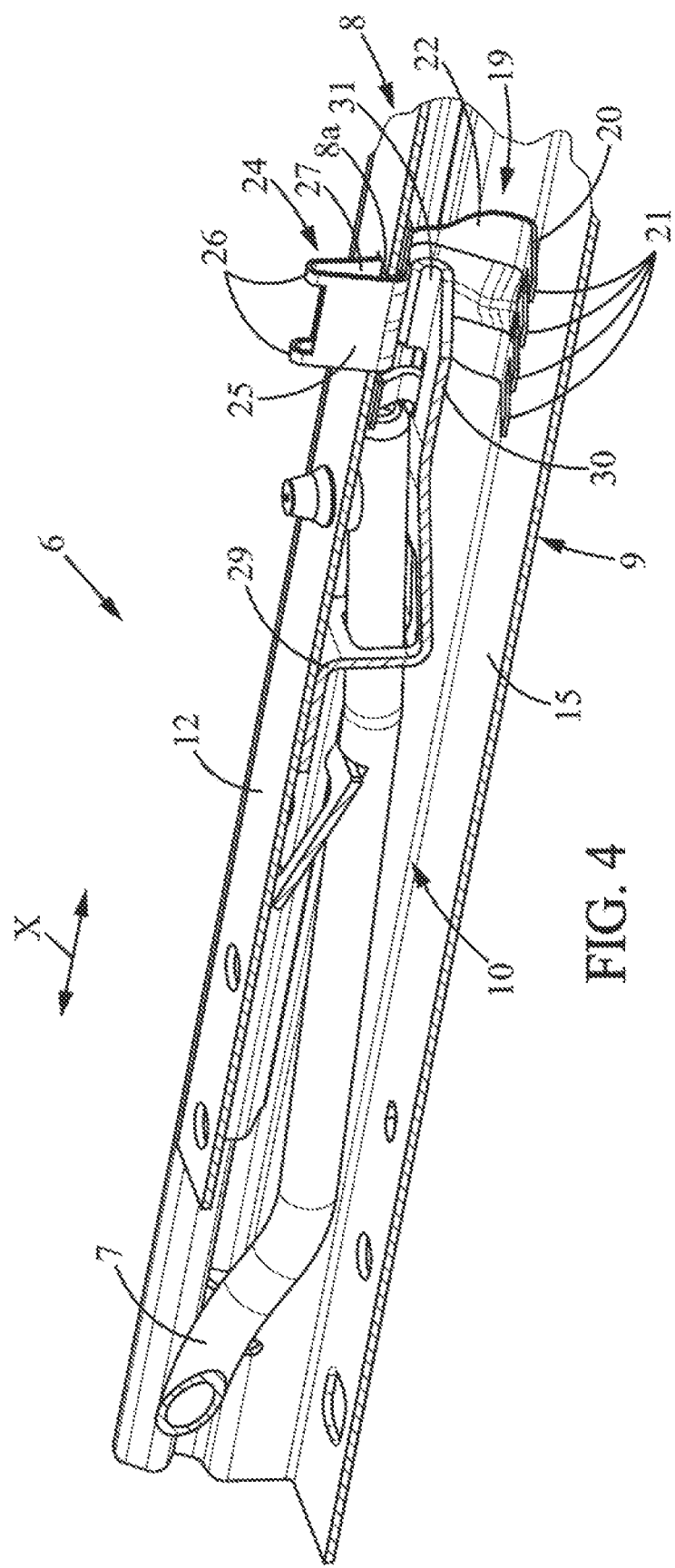
FIG. 4 is a perspective view in a longitudinal cross-section of a portion of the rail of FIG. 2.
Figure 5:
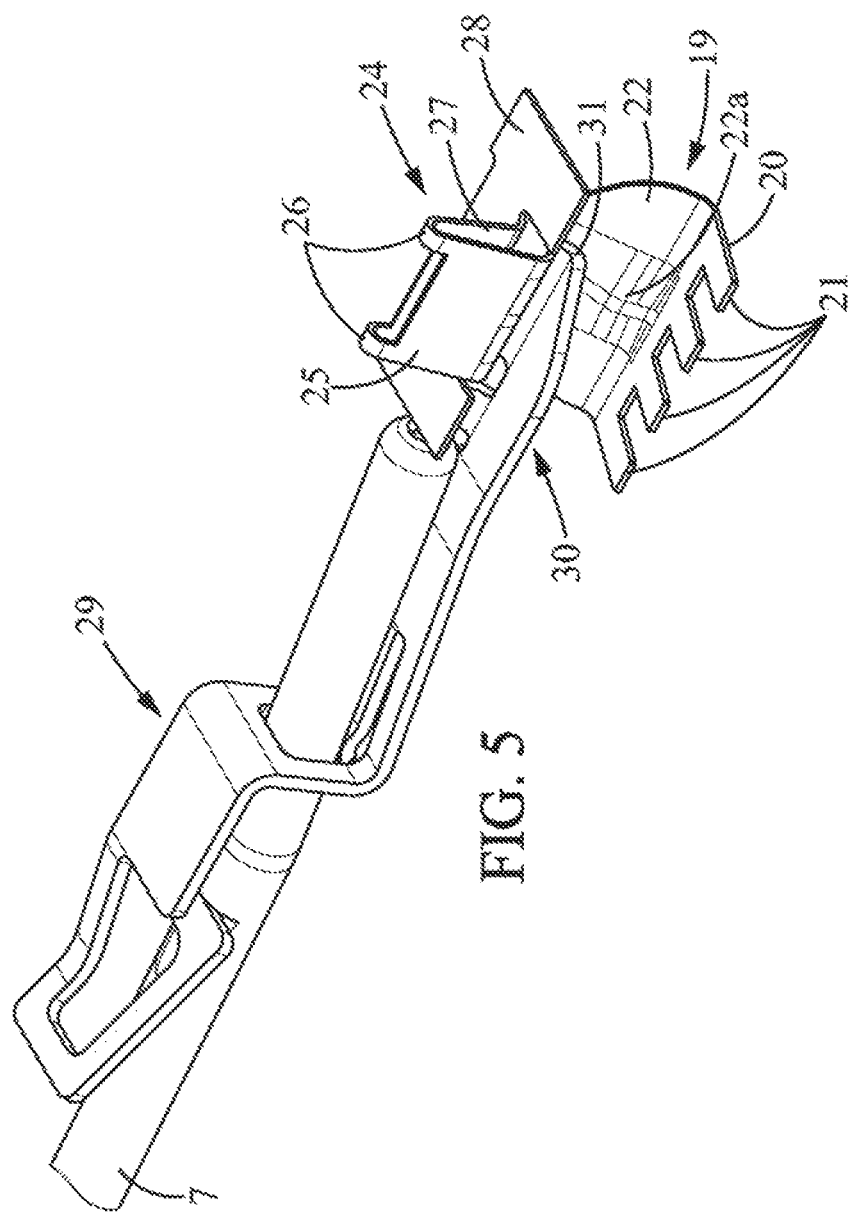
FIG. 5 is a perspective view of a control device for the rail of FIG. 2.

As represented in FIGS. 3, 4, and 5, the lock 19 may be a single metal piece made, for example, of spring steel and comprising:

said locking portion 20, which in the locked position is substantially parallel to the lower web 15 of the second profile section 9 and is adapted to selectively engage with and disengage from said indentations 18a through said windows 13a, a cam portion 22, which in this case comprises a boss 22a bulging toward flange 13, this cam portion 22 extending the locking portion 20 toward the upper web 12 of the first profile section 8, obliquely upwards and toward side flange 14, this cam portion 22 possibly having in its upper portion a return 23 extending toward side flange 13, said elastic portion 24, extending the return 23 of the cam portion 22 toward the upper web 12 of the first profile section 8 and through a window 8a arranged in this upper web 12.

This elastic portion 23 of the lock 19 may comprise, for example, first and second blades 25, 27 connected by a fold 26, the first blade 25 extending the return 23 of the cam portion 22 outward through said window 8a arranged in the upper web 12 of the first profile section 8, and the second blade 27 extending from the fold 26 toward the inside space 10 of the rail 6 through said window 8a to an attachment portion 28, which may be for example a plate attached by welding or other means beneath the upper web 12 of the first profile section 8.

The rail 6 further comprises a spring blade 29 attached to the first profile section 8 within said inside space 10 and controlling the lock 19, this spring blade 29 normally being in a rest position where said spring blade 29 leaves the lock in the locked position.

More specifically, said spring blade 29 is attached beneath the upper web 12 of the first profile section 8 and secured (in known manner) to one of the arms of the crossbar 7, thereby forming a control lever, and said spring blade 29 has a free end 30 forming a control section 31, in this case a curved edge facing the boss 22a of the cam portion 22 of the lock 19, the curved edge in question having a rounded side facing the boss 22a of the cam portion 22.

Figure 6:
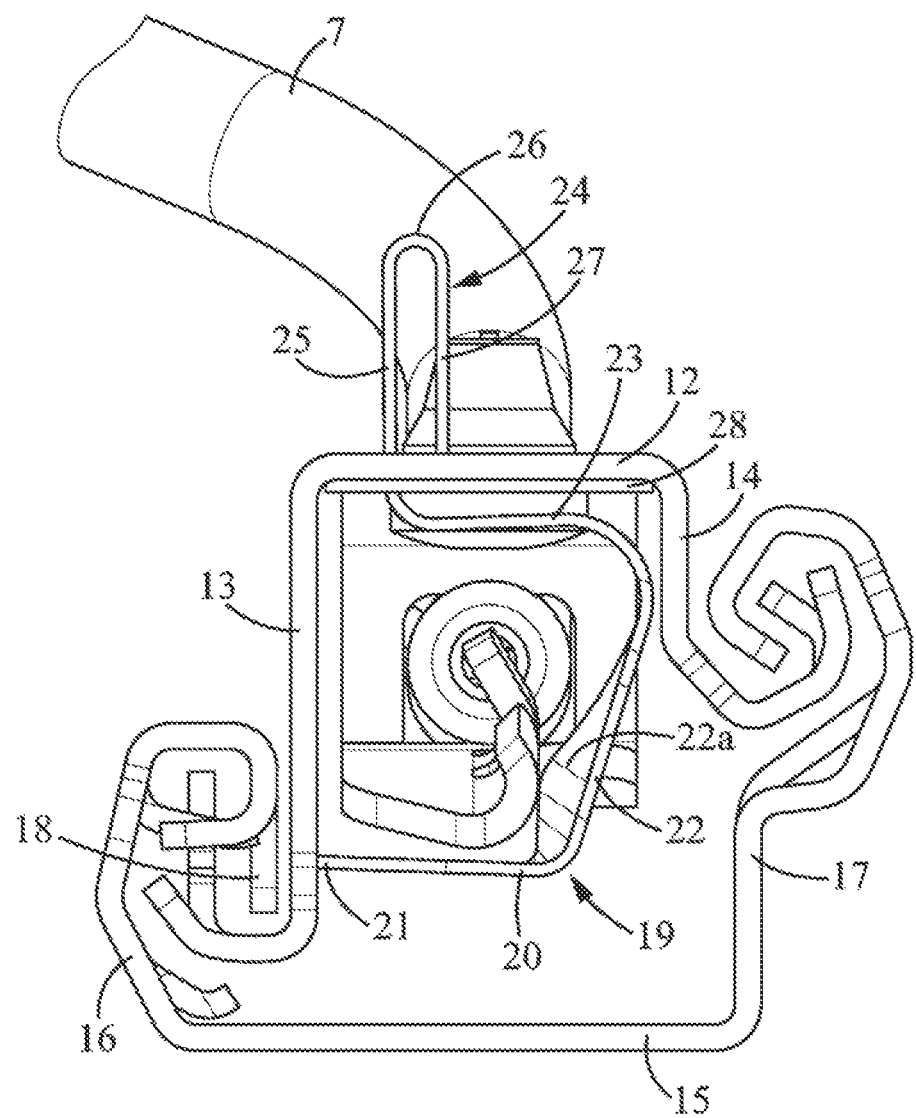
FIG. 6 is an end view of the rail of FIG. 2, in the unlocked position.
Figure 7:
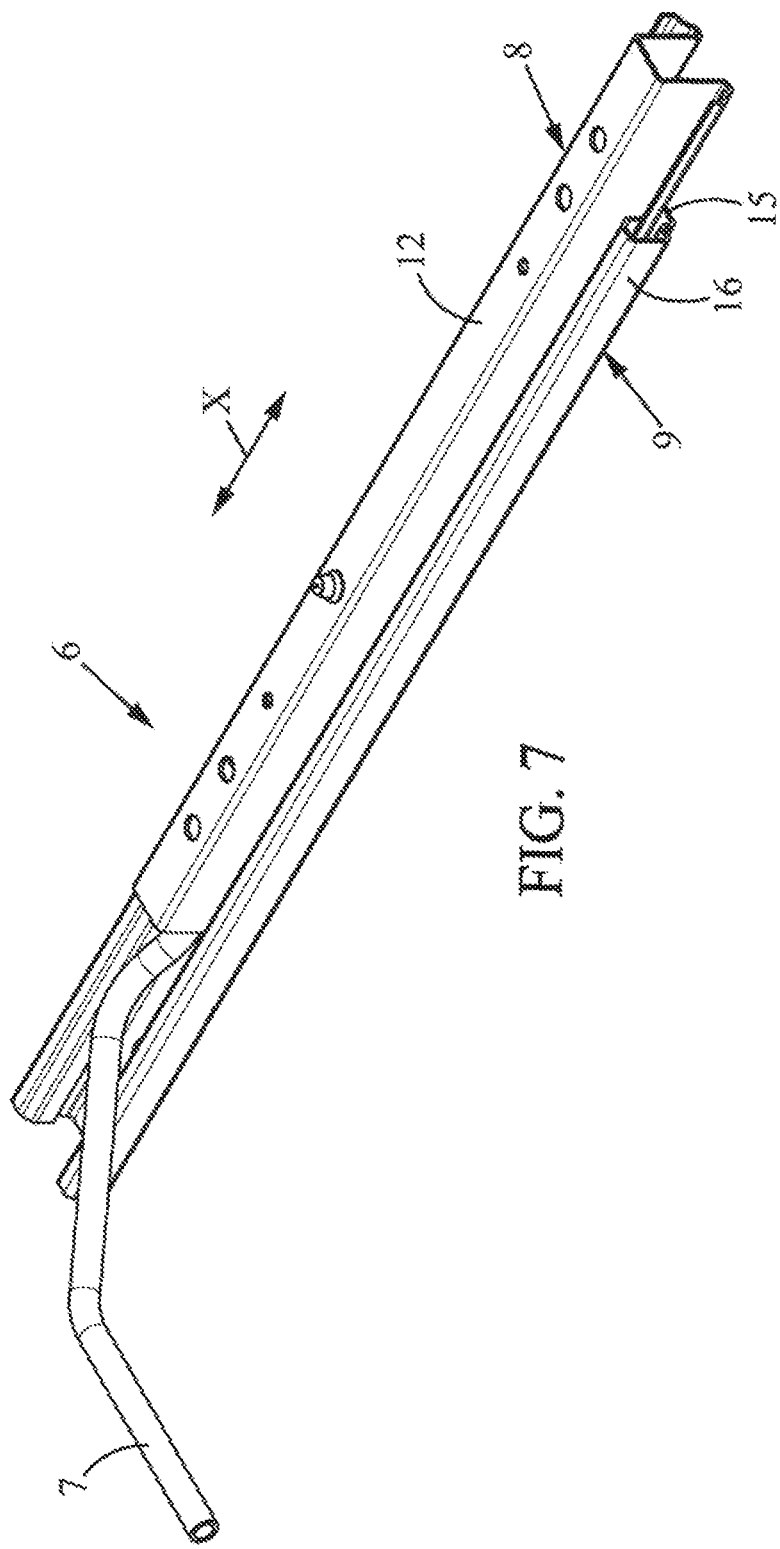
FIG. 7 is a perspective view of one of the rails supporting a seating portion of FIG. 1, in a second embodiment of the invention.

The control portion 31 is adapted to press against the boss 22a of the cam portion 22 of the lock 19 when a user actuates the crossbar 7 by lifting its central portion at the front of the seat 1, the effect of the cam moving the lock 19 to its unlocked position (FIG. 6).

The rail 6 of FIGS. 7 to 11, in the second embodiment of the invention, is similar to the rail 6 described above and therefore only the differences from the first embodiment will be described below.

In this second embodiment, the shape of the first and second profile sections is different from the first embodiment, with the right and left sides of these profile sections being symmetrical here, although this difference is not essential.

Figure 8:
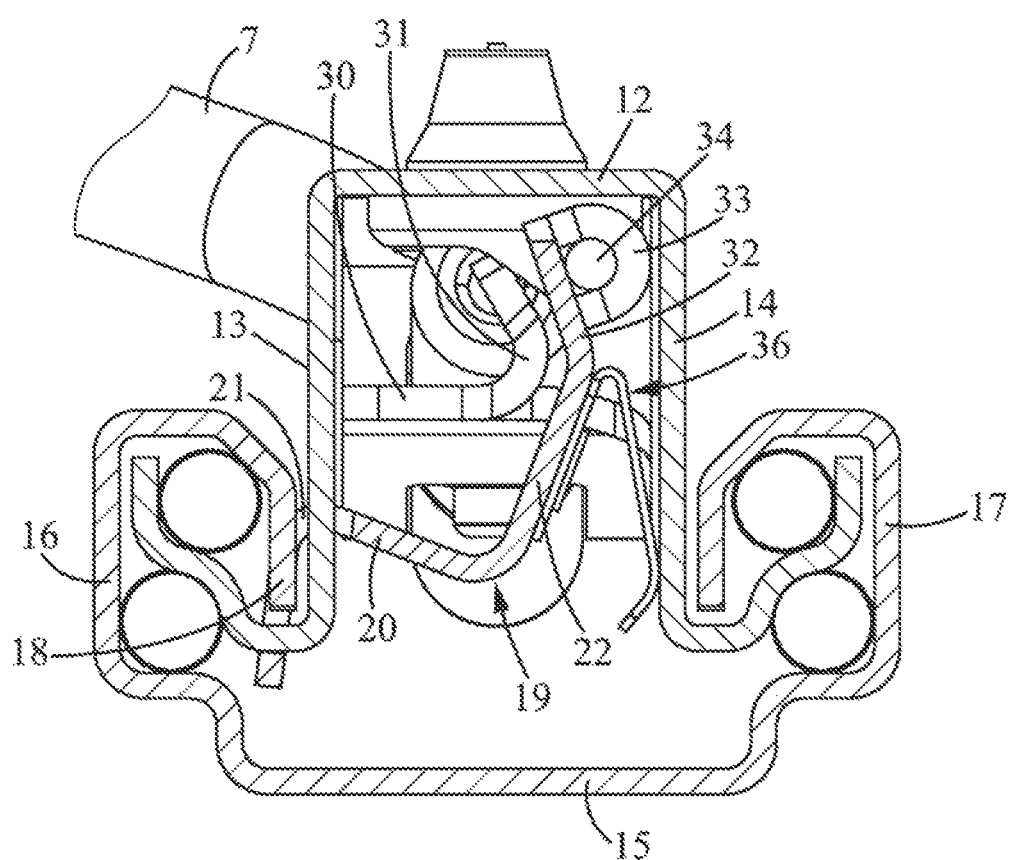
FIG. 8 is an end view of the rail of FIG. 7, in the locked position.
Figure 9:
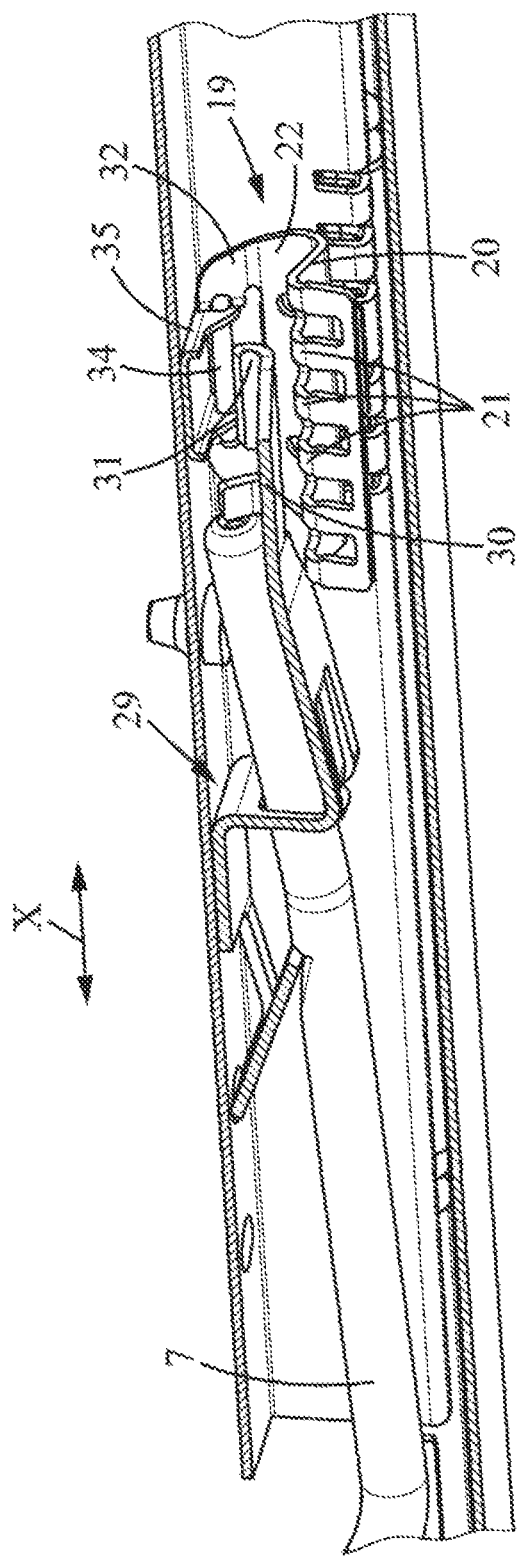
FIG. 9 is a perspective view of a longitudinal cross-section of a portion of the rail of FIG. 7.
Figure 10:
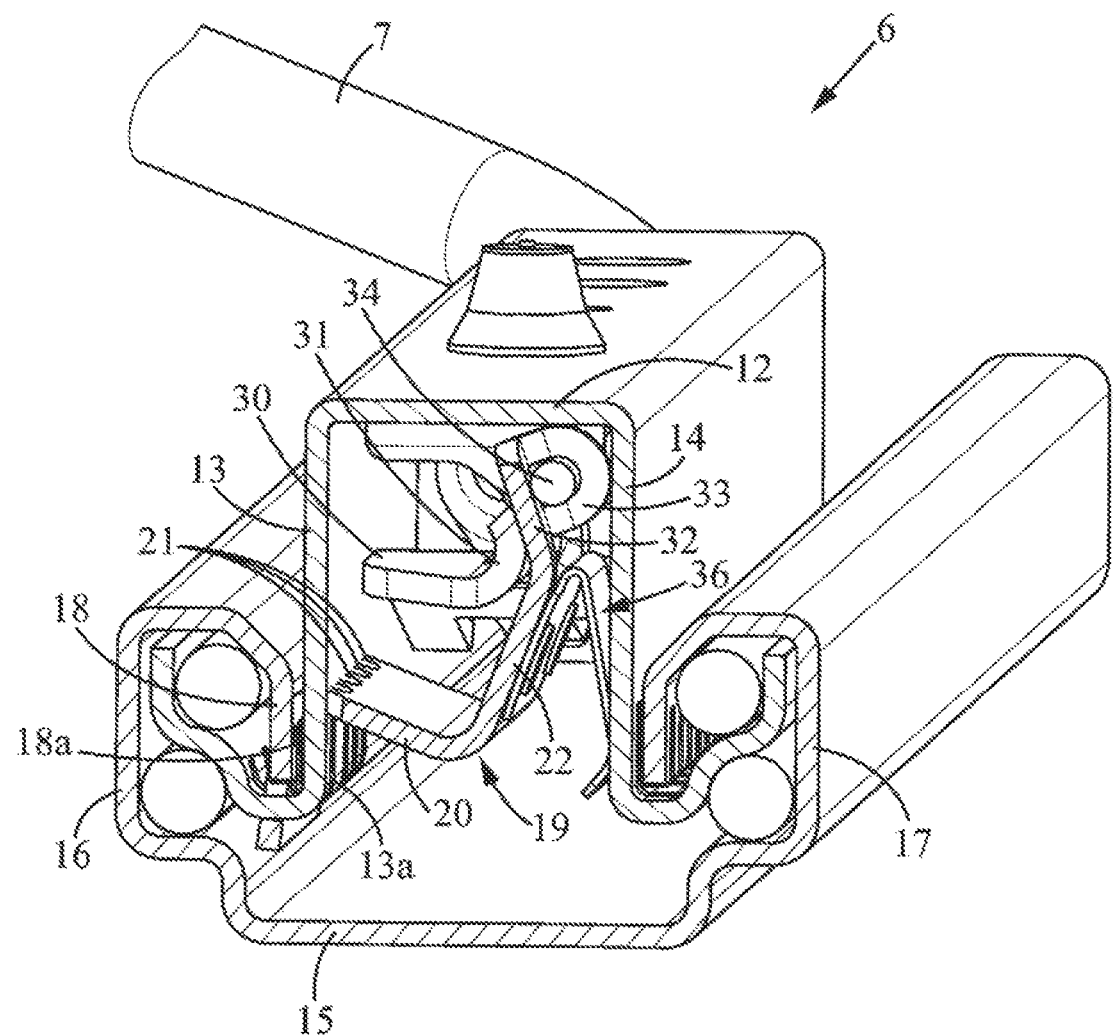
FIG. 10 is a cross-sectional view of the rail of FIG. 7, in the locked position.
Figure 11:
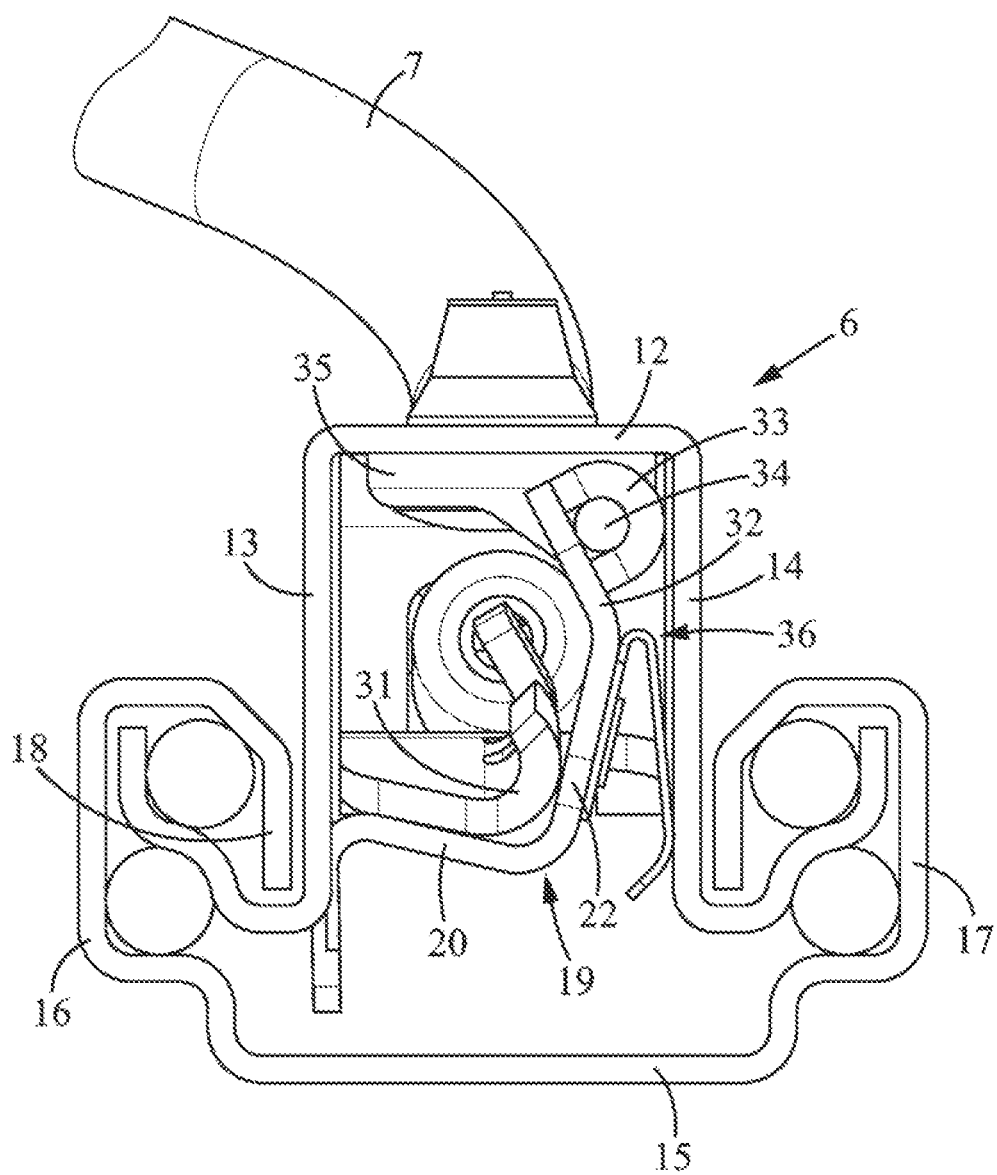
FIG. 11 is an end view of the rail of FIG. 7, in the unlocked position.

As before, the side flange 13 of the first profile section comprises windows 13a which the teeth 21 of the locking portion 20 of the lock 19 pass through, and the teeth 21 can selectively penetrate the indentations 18a of the hanging terminal wall 18 of the side flange 16 of the second profile section, as represented in FIGS. 8 to 10.

The lock 19 here has a different form than the lock previously described, because its locking portion does not include an elastic portion 24 and is mounted beneath the upper web 12 of the first profile section by a pivotal connection.

In the example represented, the locking portion 20 of the lock 19 is extended as before by a cam portion 22 (without the boss 22a in the example shown) which extends, as in the first embodiment, obliquely upwards and toward side flange 14 when the lock 19 is in the locked position. This cam portion 22 is extended upward by a support portion 32 having trunnions 33 mounted to pivot on a pivot 34 carried by a metal support 35 secured by welding or other means beneath the upper web 12 of the first profile section.

In addition, the lock 19 is integral to a spring blade 36 or other resilient member which here is attached to the cam portion 22 of the lock and presses against the inside of the side flange 14 of the first profile section 8 to resiliently urge the lock 19 toward the locked position.

As above, the control portion 31 of the spring blade acts on the cam portion 22 of the lock when the crossbar 7 is actuated by a user, here in order to pivot the lock 19 to the unlocked position by the effect of the cam (FIG. 11) so as to disengage the teeth 21 of the lock from the indentations 18a of the second profile section 9.

The invention claimed is:

1. Rail for a vehicle seat, comprising:
   first and second profile sections mounted so as to slide relative to one another in a longitudinal direction and defining a hollow inside space between them,
   a lock predominantly arranged within said inside space and movable between
      a locked position where said lock immobilizes the first and second profile sections relative to one another, and
      an unlocked position where said lock allows the first and second profile sections to slide relative to one another,
   a spring blade attached to the first profile section within said inside space and controlling the lock, said spring blade being normally in a rest position where said spring blade leaves the lock in the locked position, and
   a control member connected to the spring blade and actuated by a user to elastically deform the spring blade to an unlocking position where said spring blade places the lock in the unlocked position,
   wherein the lock is mounted on the first profile section independently of the spring blade and is resiliently biased toward the locked position, and said spring blade comprises a control portion adapted to act on the lock in order to move it toward the unlocked position when the control member is actuated,
   wherein the lock is connected to the first profile section by at least one elastic portion resiliently biasing the lock toward the locked position,
   wherein said elastic portion is part of the lock and is attached to the first profile section, and
   wherein each of the first and second profile sections comprises a web and two side flanges, at least one of the side flanges of the second profile section comprising indentations suitable for receiving the lock in the locking position, the lock being a metal part which comprises:
      a locking portion substantially parallel to the web of the second profile section and adapted to selectively engage with and disengage from said indentations, and
      a cam portion with which the control portion of the spring blade is adapted to act by pressing to move the lock to the unlocked position by the effect of the cam, the cam portion extending the locking portion toward the web of the first profile section,
   said elastic portion extending the cam portion toward the web of the first profile section.

2. Rail according to claim 1, wherein the control portion of the spring blade is adapted to press on the cam portion in response to user actuation of the control member in order to move the lock to the unlocked position.

3. Rail according to claim 1, wherein the lock is mounted on the first profile section so as to move in a transverse direction to allow selectively engaging and disengaging said lock relative to said indentations.

4. Rail according to claim 1, wherein said elastic portion of the lock comprises first and second blades connected by a fold, the first blade extending the cam portion outwardly through a window arranged in the web of the first profile section and the second blade extending from the fold toward the inside space of the rail through said window to an attachment portion fixed beneath the web of the first profile section.

5. Rail according to claim 1, wherein the lock is pivotally mounted on the first profile section.

6. Vehicle seat comprising at least one rail according to claim 1 and a seating portion attached to the first profile section of said rail.

* * * * *